W. J. Stevenson,
Soldering Clamp.
N° 12,219.  Patented Jan. 9, 1855.
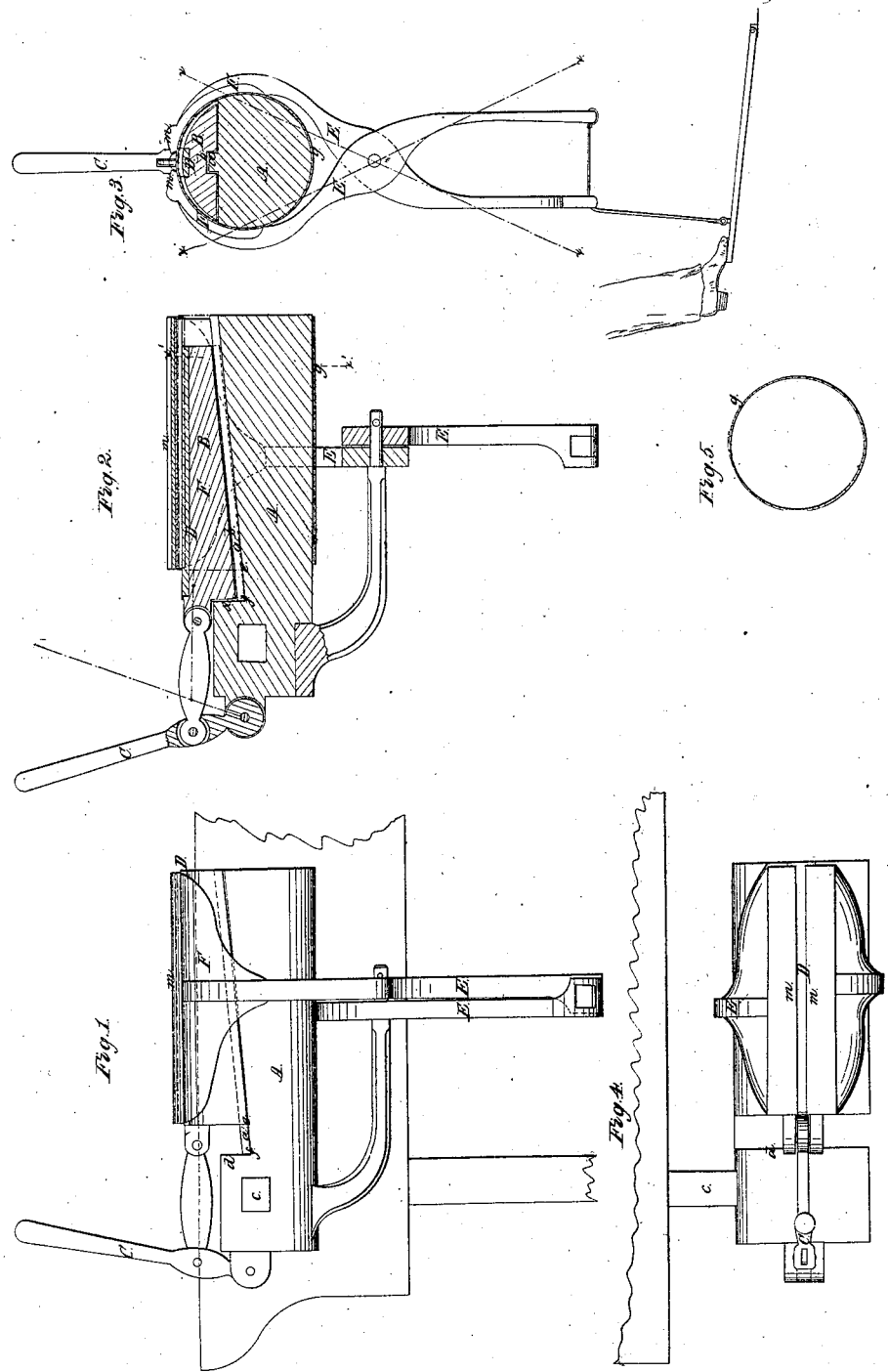

UNITED STATES PATENT OFFICE.

WILLIAM J. STEVENSON, OF NEW YORK, N. Y.

IMPROVEMENT IN APPARATUS FOR SOLDERING TIN CANS.

Specification forming part of Letters Patent No. 12,219, dated January 9, 1855.

*To all whom it may concern:*

Be it known that I, WILLIAM J. STEVENSON, of the city, county, and State of New York, have invented a new and useful Improvement in the Art of Soldering the Straight Seams of Preserve and other Tin Cans; and I do hereby declare that the following is a full, clear, and exact description of the same, reference being had to the accompanying drawings, forming a part of this specification, in which—

Figure 1 is a side elevation of my improvement attached to a tinner's work-bench, the soldering-mandrel being expanded. Fig. 2 is a vertical longitudinal section of the same detached from the bench, the mandrel being contracted. Fig. 3 is a vertical transverse section through the line $x'$ $x'$ in Fig. 2. Fig. 4 is a plan of the same. Fig. 5 is a top view of the article to be soldered by my improvement.

Similar letters of reference in each of the several figures indicate corresponding parts.

This invention relates to a new and useful mode of soldering the straight seams or joints of tin preserve-cans, whereby the process can be performed more expeditiously and perfectly and at a less cost for labor, as it can be done by a boy with slight experience in the art in a better manner than by the most skilled tin-man in the old way.

The nature of the invention consists in so constructing the upper extremities of the jaws of the clamp that they shall, when brought together, form a groove or channel just in line with the joint or seam to be soldered, to receive the solder and retain it where its presence is required when melted. By thus confining the solder a neat and regular bead is also formed on the outside of the can.

It consists, second, in inserting a strip of wood into that part of the periphery of the mandrel which comes under the seam or joint. By thus interposing a strip of wood the solder, when melted, is allowed to retain its heat longer, and the entire strip can be melted before any portion again becomes solid, and consequently a more perfect insinuation of the solder into the seam or under the lap secured.

To enable others skilled in the art to make and use my invention, I will proceed to describe its construction and operation.

A B represent the two sections of the mandrel, united loosely together by a tongue and groove, $a$ $b$, as shown in Figs. 2 and 3. The section A is made stationary, being attached to a bench by an arm, $c$, passing through it. This section is made with a shoulder, $d$, and serves for section B to rest against when the mandrel is contracted. The section B is not stationary with A, but made capable of sliding back and forth over the inclined surface of A, provision for these movements being made by continuing the line which divides the mandrel obliquely to its axis from the point $e$ to the point $f$.

C is a lever hinged to the back end of the section A, and connected by a link to the section B, as shown. This lever serves for moving the section B from the position shown in red in Figs. 2 and 3 to the position shown in black in same figures, and vice versa. When the section A occupies the position shown in red in Figs. 2 and 3 and in black in Figs. 1 and 4, the mandrel is expanded and ready for use, the can $g$ being fitted and clamped on it, as shown, and when it occupies the position shown in black in Figs. 2 and 3, the mandrel is contracted and in a state to admit of the can being easily removed.

D is the strip of wood for preventing the iron cooling the solder so rapidly. It is fitted in the periphery of the section B at the point where the soldering is performed.

E E represent the levers forming the clamp. They are shaped so as to fit round the mandrel and to cross each other underneath the same, and then to extend down a short distance. These levers turn on the end of a bracket, $h$, secured to the under side of the section A.

F F are the jaws of the clamp. They are shaped to correspond to the cylindrical form of the can, and to take in the whole of the upper side of the same with the exception of the lap. The upper extremity, $m$, of each of these jaws is shaped as shown in Fig. 3, so that when they come together they may form a groove or channel for the solder to lay in, as illustrated, and be confined in when melted.

It will be observed by examining the drawings that the inside edges of $m$ $m$ are beveled under slightly. This is done to prevent the same being tinned in the process of soldering the seam or joint.

Operation: The clamps are thrown open or made to assume the positions indicated by the red lines $x\,x$, and the tin can fitted on the mandrel, as shown in Fig. 3. This being done, the clamps are brought together and the can made to take a perfect shape from the mandrel by applying the foot to a treadle, as illustrated in Fig. 3. The strip of solder is now laid in the groove or channel and melted by a hatchet-shaped soldering-iron. Soon as the solder again cools the mandrel is contracted, as shown in black in Figs. 2 and 3, by laying hold of the lever C and moving it from the position shown in Fig. 1 to that shown in Fig. 2. As soon as the mandrel is thus contracted, the can may be removed with ease and facility.

What I claim as my invention is—

1. The manner herein described and shown of constructing the upper extremities of the jaws of the clamp, for the purpose of forming a groove or channel to receive a strip of solder and confine it where its presence is required after being melted.

2. The manner herein shown of interposing a strip of wood between the cold iron of the mandrel and the lap forming the joint or seam of the can, for the purpose of preventing the solder being cooled too rapidly after it has been melted.

WILLIAM J. STEVENSON.

Witnesses:
S. H. WALES,
J. G. MASON.